Feb. 6, 1951 — R. R. ROLPH — 2,540,548
BEARING FOR UNIVERSAL JOINTS
Filed Oct. 15, 1945

Inventor:
Rapha R. Rolph

Patented Feb. 6, 1951

2,540,548

UNITED STATES PATENT OFFICE 2,540,548

BEARING FOR UNIVERSAL JOINTS

Rapha R. Rolph, Detroit, Mich., assignor to Borg-Warner Corporation, Chicago, Ill., a corporation of Illinois Application October 15, 1945, Serial No. 622,395

10 Claims. (Cl. 308—207)

1

This invention relates generally to a bearing device and more particularly to a bearing device comprising a cup-shaped bearing member having a cylindrical shaft extending into the cup, said shaft and cup having a plurality of roller bearings positioned between them.

Although such bearing devices may be employed in many ways, my invention is illustrated in a bearing device which forms a portion of a universal joint structure of the cross and yoke type. It has been found in such universal joints that breakdown of the shaft or trunnion member and of the bearing cup frequently occurs under heavy loading. This breakdown occurs, for example, at a corner formed by an annular relief passageway which is positioned between the side wall and end wall of the cup. This annular relief is produced by a milling operation and is employed for the purpose of permitting finishing tools to put a bearing surface along the length of the side wall of the cup. At such a corner there is less metal to sustain the load imposed on the bearing surface and consequently breakdown may occur. The end of the shaft or trunnion member in the cup is subject to breakdown for the same reason.

It is the principal object of this invention, therefore, to provide a bearing device of the kind described above which is adapted to bear heavy loads without permitting the rollers to break down the bearing surface of either the cup or of the shaft extending into the cup. To this end roller bearings are provided which roller bearings have their bearing surfaces positioned away from such portions of the cup and shaft as are less able to sustain the load.

In the accomplishment of the foregoing object it is a further object to have the bearing surface of the roller bearings positioned away from the weak points on said cup and shaft by reason of the construction of the roller bearings themselves. To attain this object one end of each roller may be tapered or crowned.

It is another object to have the bearing surface of the roller bearing positioned away from the weak points on said cup and shaft by shortening the axial dimensions of the rollers and positioning an annular member, such as a spacer washer, around the shaft so that it fits between the bottom of the cup and the roller bearing.

It is still another object to make less expensive the production of such an improved bearing device by employing a spacer washer which has a chamfered or beveled edge adjacent the intersection of the internal side wall and the internal end wall of the cup. Since the washer positions the roller bearings away from the bottom of the cup—so as to prevent destruction of the bearing cup and shaft at their weakest points—it is unnecessary that the bearing surface on the side wall of the cup run to the bottom of said cup. Consequently there is eliminated the necessity of undercutting the side wall of the cup to provide an annular relief passageway.

Other objects and advantages of my invention will appear from a consideration of the following written description taken in connection with the accompanying drawings in which.

Throughout the written description like reference numerals will be applied to like members of the various structures illustrated.

Figure 1:
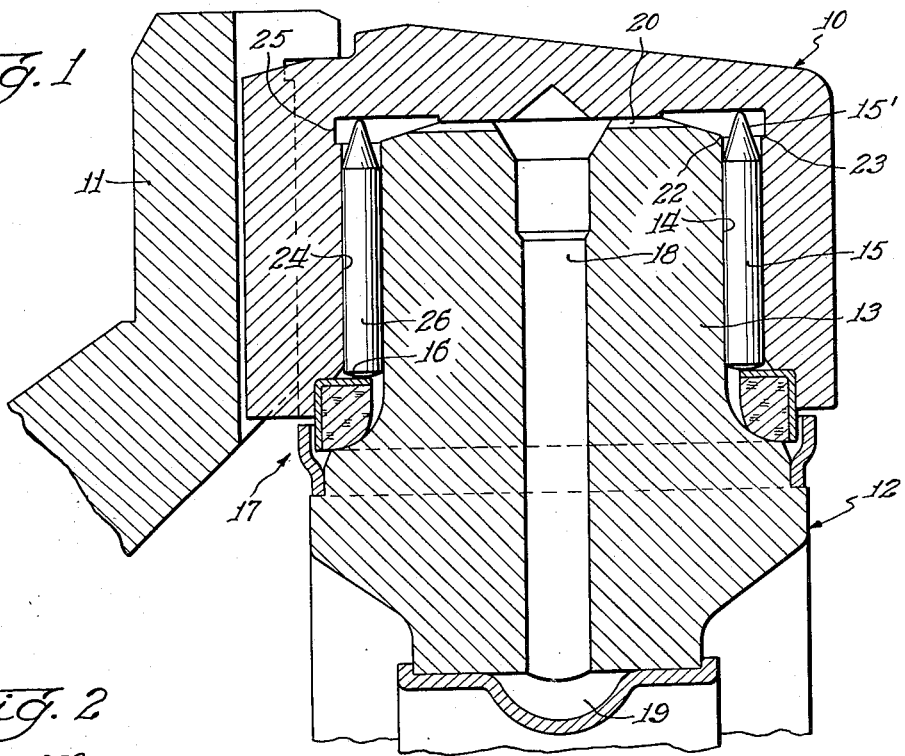
Fig. 1 is a vertical sectional veiw, partially in elevation, of a portion of a universal joint embodying my invention.

Referring now to Fig. 1 there will be seen a bearing cup 10 secured in some suitable manner, as by screws, to a yoke arm 11 of a universal joint structure. A trunnion bearing ring member 12 carries a series of trunnions such as trunnion 13 which extends into the interior of bearing cup 10 and has a bearing surface 14. A series of roller bearings 15 are positioned circumferentially about the trunnion 13, said roller bearings having their ends, which are nearest the closed end of the cup, tapered as indicated at 15', the other ends of said bearing being slightly rounded, as indicated at 16, and being maintained in the space between the bearing cup 10 and the trunnion 13 by the end wall of the cup 10 and by a combined roller retainer and lubricant seal indicated generally at 17. The trunnion 13 has a central lubricant passageway 18 communicating at one end with an annular lubricant passageway 19 in the trunnion bearing ring member 12. The opposite end of passageway 18 is in communication with the transverse passageway 20 across the end of the trunnion 13, said series of passageways serving to permit the flow of lubricant to the roller bearings and bearing surfaces of the cup and trunnion. The lubricant is retained in the bearing cup 10 by the seal and roller retainer 17.

It will be noted that the tapered portion 15' of each of the roller bearings extends from the closed end of the bearing cup 10 past the corner 22 on the trunnion 13 and past the corner 23 formed at the intersection of the bearing surface 24 of the cup 10 and the annular relief passageway 25. It is the corners 22 and 23, which have less metal backing them, which are most easily broken down by the load transferred between the trunnion 13 and the bearing cup 10 through the roller bearings 15. By positioning the bearing surface 26 of each of the roller bearings 15 away from the bottom of the bearing cup 10 and thereby away from the corners 22 and 23, it is possible to prevent destruction of the bearing surfaces 24 and 14 of the cup 10 and the trunnion 13, respectively.

Figure 2:
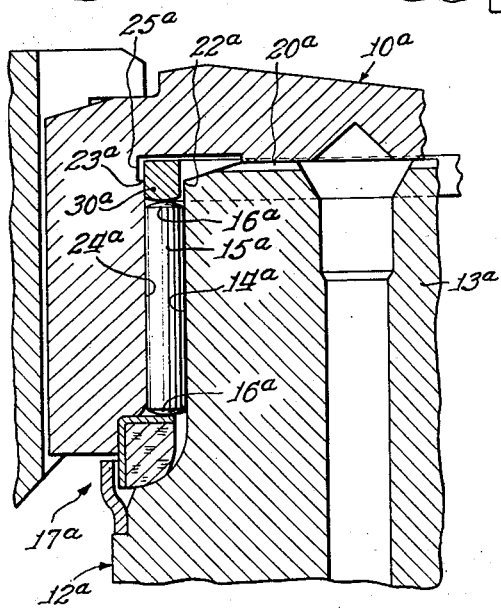
Fig. 2 is a vertical sectional view, partially in elevation, of a portion of a universal joint embodying a modification of the invention.

Referring now to Fig. 2, there will be seen a bearing cup 10a having an internal bearing surface 24a along its inner side wall and an annular relief passageway 25a adjacent the closed end of the cup. A trunnion bearing ring member 12a bearing a trunnion 13a extending into the cup 10a has a bearing surface 14a. Positioned between the bearing surfaces of the trunnion 13a and of the cup 10a are a series of roller bearings 15a which space the cup and trunnion, permit frictionless relative rotation between said cup and trunnion, and serve to transmit load from the cup to the trunnion or vice versa. The roller bearings 15a are positioned in an axial direction between a combined roller retainer and lubricant seal 17a at the open end of the cup and by an annular member, such as spacer washer 30a, which fits loosely about the trunnion 13a adjacent the closed end of the cup 10a. The washer 30a serves to position the roller bearings 15a away from the corners 22a and 23a, formed respectively on the trunnion 13a and bearing cup 10a. Because of its loose fit about trunnion 13a the washer 30a does not prevent the flow of lubricant from the passageway 20a to the roller bearings 15a. The washer 30a is shown as being substantially square in cross-section with the side adjacent the roller bearing being slightly curved. However, the exact shape of washer 30a is immaterial. The roller bearings 15a are shown as having slightly rounded ends 16a but they may of course be flat on the ends if so desired.

Figure 3:
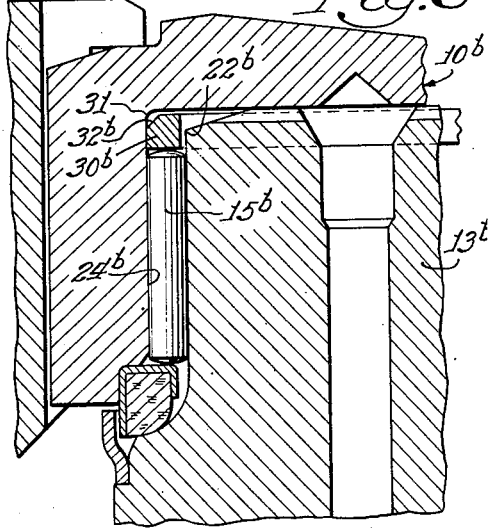
Fig. 3 is a vertical sectional view, partially in elevation, of a portion of a universal joint embodying another modification of my invention.

Referring now to Fig. 3, it will be noted that the various elements of the bearing device and universal joint structure are substantially the same. However, bearing cup 10b in this modification of my invention is not formed with an annular relief passageway, the side wall and end wall of said cup being joined by a fillet 31. The spacer washer 30b is provided with a chamfered edge 32b opposite the fillet 31 so that the spacer washer may fit against the closed end of the cup 10b. Since the annular spacer washer positions the roller bearings 15b away from the end of the cup it is not necessary that the bearing surface 24b of the cup be extended all the way to the closed end of the cup. Consequently, no annular relief channel is needed adjacent the closed end of the cup, the finishing tool which produces the bearing surface 24b not being required to descend as far into the cup as would be required if the bearing surface 24b were to be extended substantially to the bottom of the cup. In this modification of my invention the spacer washer only prevents the roller bearings 15b from bearing against the corner 22b of the trunnion 13b, since there is no opposing corner on the cup 10b which is subject to being broken down.

The foregoing specific description of my invention has been for purposes of illustration only and is not to be deemed limiting except to the extent that the appended claims are so limited.

I claim:

1. A bearing device comprising, in combination, a cup having a bearing surface on its internal side wall, a member extending into said cup and having a bearing surface in opposed relation to the bearing surface of the cup, and roller bearings positioned between the bearing surfaces of said cup and said member, and an element disposed between the closed end of the cup and the adjacent ends of said roller bearings and extending between the bearing surfaces of said cup and member to position said roller bearing ends inwardly of the adjacent ends of the bearing surfaces of said member and said cup and thereby positioning the bearing surface of each of said roller bearings away from those portions of the bearing surface of the cup and of the member which are adjacent the closed end of said cup.

2. A bearing device comprising, in combination, a cup having a bearing surface on its internal side wall and an annular relief between said bearing surface and the internal end wall of the cup, a member extending into said cup and having a bearing surface in opposed relation to said bearing surface of the cup and having a reduced end portion, roller bearings positioned between said bearing surfaces, and an annular element positioned around said member adjacent said internal end wall of the cup to position the bearing surface of each of said roller bearings away from the bearing surface of said cup which is adjacent the annular relief and from the bearing surface on the member which is adjacent its said reduced end portion.

3. A bearing device comprising, in combination, a cup having a bearing surface on its internal side wall and on its internal end wall and having an annular relief between said side and end walls, a member having a cylindrical bearing surface and a reduced end extending into said cup, said reduced end being adapted to bear against the internal end wall of the cup, and roller bearings fitting between the bearing surfaces of said cup and said member, and an annular element positioned around said member adjacent said internal end wall of said cup to space the bearing surfaces of each of said roller bearings from the bearing surface of the cup which is adjacent the annular relief and from the bearing surface of the member which is adjacent the reduced portion of said member.

4. A bearing device comprising, in combination, a cup having a bearing surface on its internal side wall, a member extending into said cup and having a bearing surface in opposed relation to the bearing surface of the cup, roller bearings positioned between the bearing surfaces of said cup and said member, each of said roller bearings having a reduced portion at its end adjacent the closed end of the cup, said reduced portion being out of contact with the bearing surfaces on said cup and said member, and an element disposed between the closed end of said cup and the reduced end portions of said bearings and extending between the bearing surfaces of said cup and member to engage the reduced end portions of said roller bearings to maintain the end portions of said roller bearings in spaced relation to the adjacent ends of the bearing surfaces of said member and cup.

5. A bearing device comprising, in combination, a cup having a bearing surface on its internal side wall, a member extending into the cup and having a bearing surface in opposed relation to the bearing surface of the cup, roller bearings positioned between the bearing surfaces of the cup and member, and an annular member positioned around said first-mentioned member adjacent the closed end of the cup to position said roller bearings away from the end of said cup and the end of said first-mentioned member.

6. The bearing device of claim 5, wherein said annular member comprises a washer having a substantially rectangular cross-section.

7. The bearing device of claim 5, wherein said annular member comprises a washer having a substantially rectangular cross-section, the side of said washer adjacent the end of each roller bearing being slightly rounded.

8. A bearing device comprising, in combination, a cup having a bearing surface on its internal side wall and an annular relief between said bearing surface and the internal end wall of the cup, a member extending into said cup and having a bearing surface in opposed relation to said bearing surface of the cup and having a reduced end portion, roller bearings positioned between said bearing surfaces, an annular member positioned around the first-mentioned member adjacent the closed end of the cup, said annular member extending from adjacent the closed end of said cup past the annular relief in the cup and past the reduced end portion of said first mentioned member.

9. A bearing device comprising, in combination, a cup having a bearing surface on its internal side wall and an annular relief between said bearing surface and the internal end wall of the cup, a member extending into said cup and having a bearing surface in opposed relation to said bearing surface of the cup and having a reduced end portion, roller bearings positioned between said bearing surfaces, an annular member positioned around said first mentioned member at the closed end of the cup to position said roller bearings away from the annular relief in the bearing cup and away from the reduced end portion of the first mentioned member.

10. The bearing device of claim 5 wherein said annular member comprises a washer having one corner chamfered, said chamfered portion being opposite the inner section of the internal side wall and end wall of the cup.

RAPHA R. ROLPH.

REFERENCES CITED

The following references are of record in the file of this patent:

UNITED STATES PATENTS

| Number | Name | Date |
|---|---|---|
| Re. 21,507 | Swenson | July 9, 1940 |
| 2,078,739 | Slaght | Apr. 27, 1937 |
| 2,209,854 | Slaght | July 30, 1940 |

FOREIGN PATENTS

| Number | Country | Date |
|---|---|---|
| 219,828 | Great Britain | Aug. 7, 1924 |